March 9, 1926.
J. R. NORDSTROM
TESTING MACHINE
Filed March 12, 1924    3 Sheets-Sheet 2
1,576,453
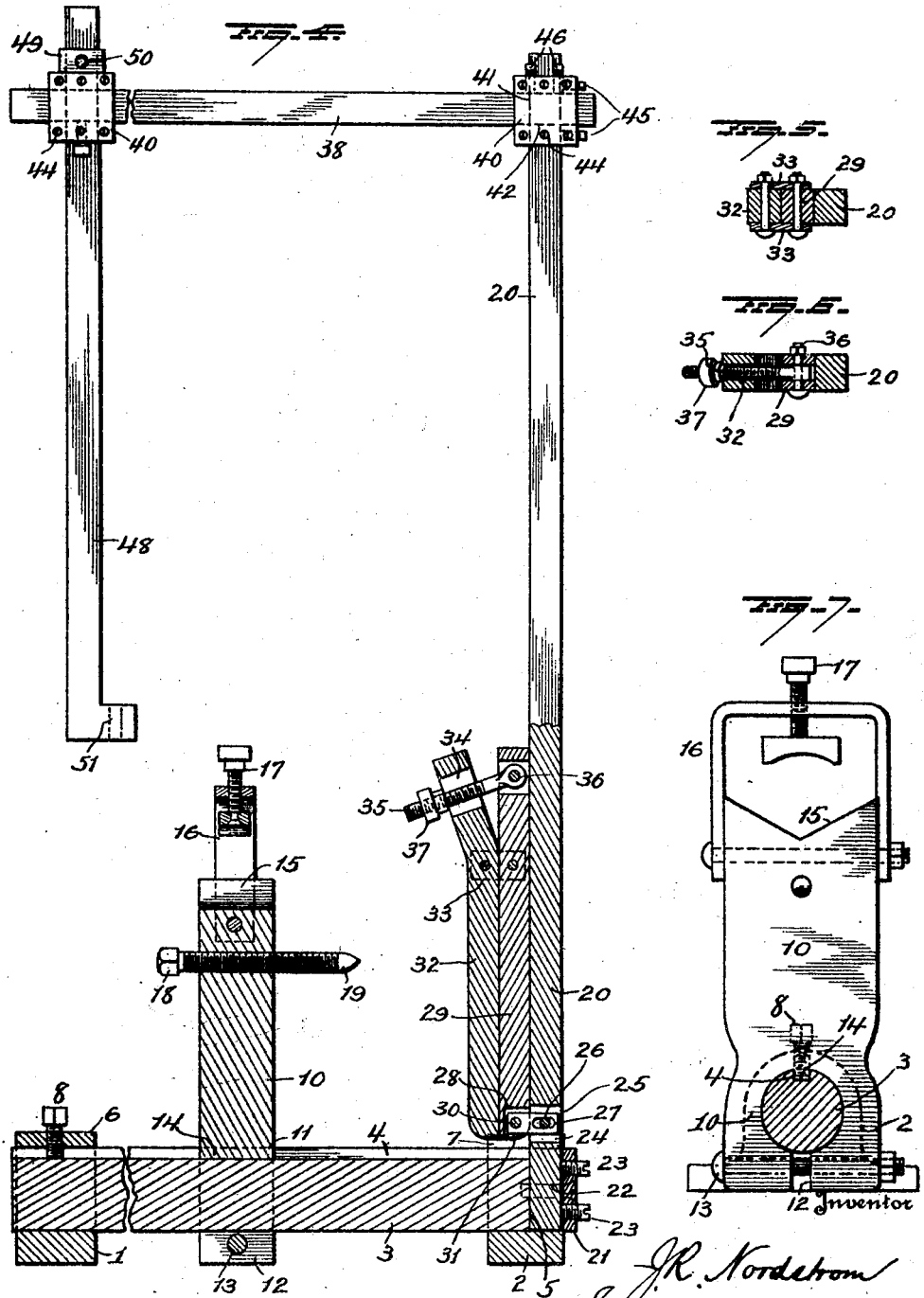

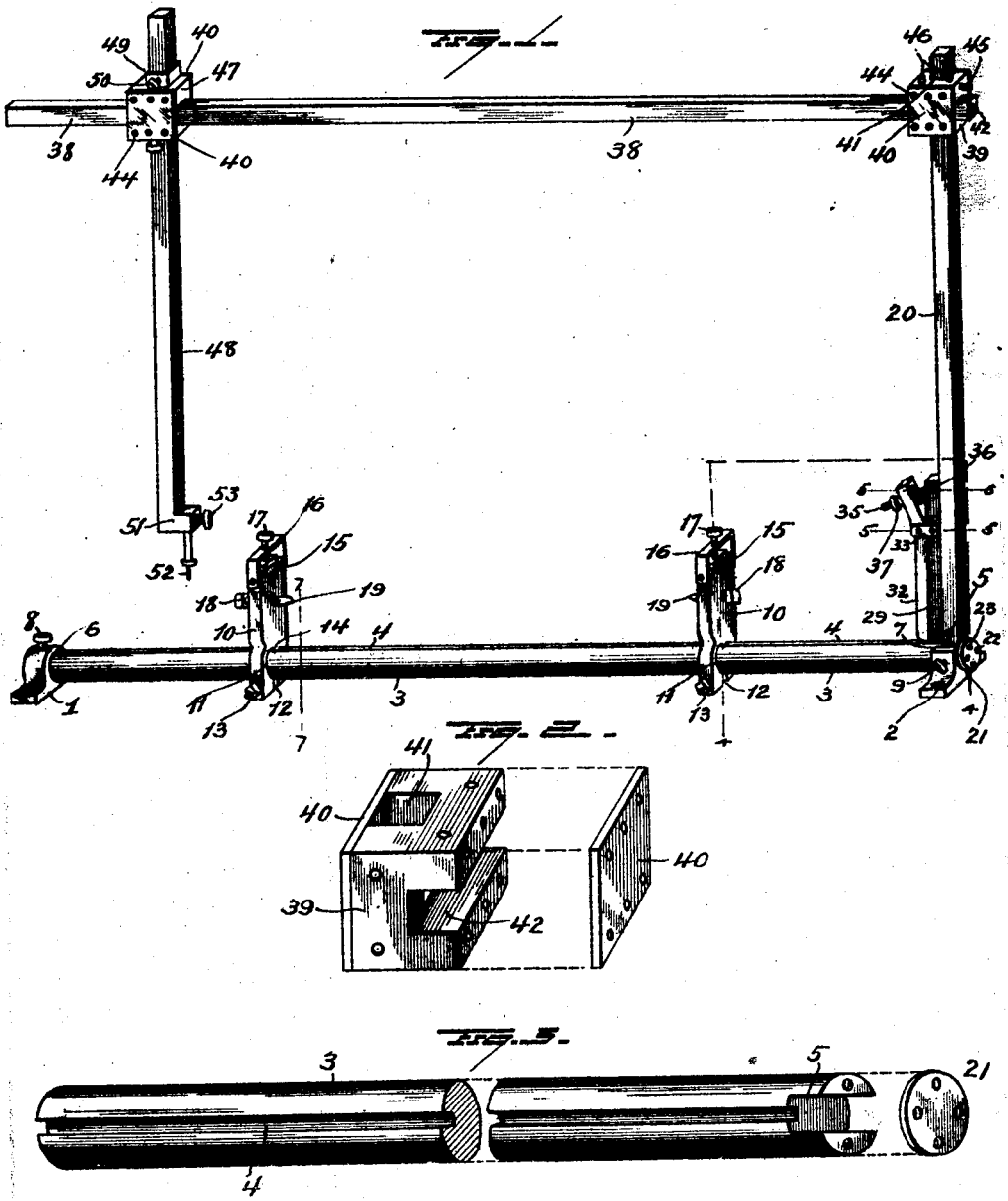

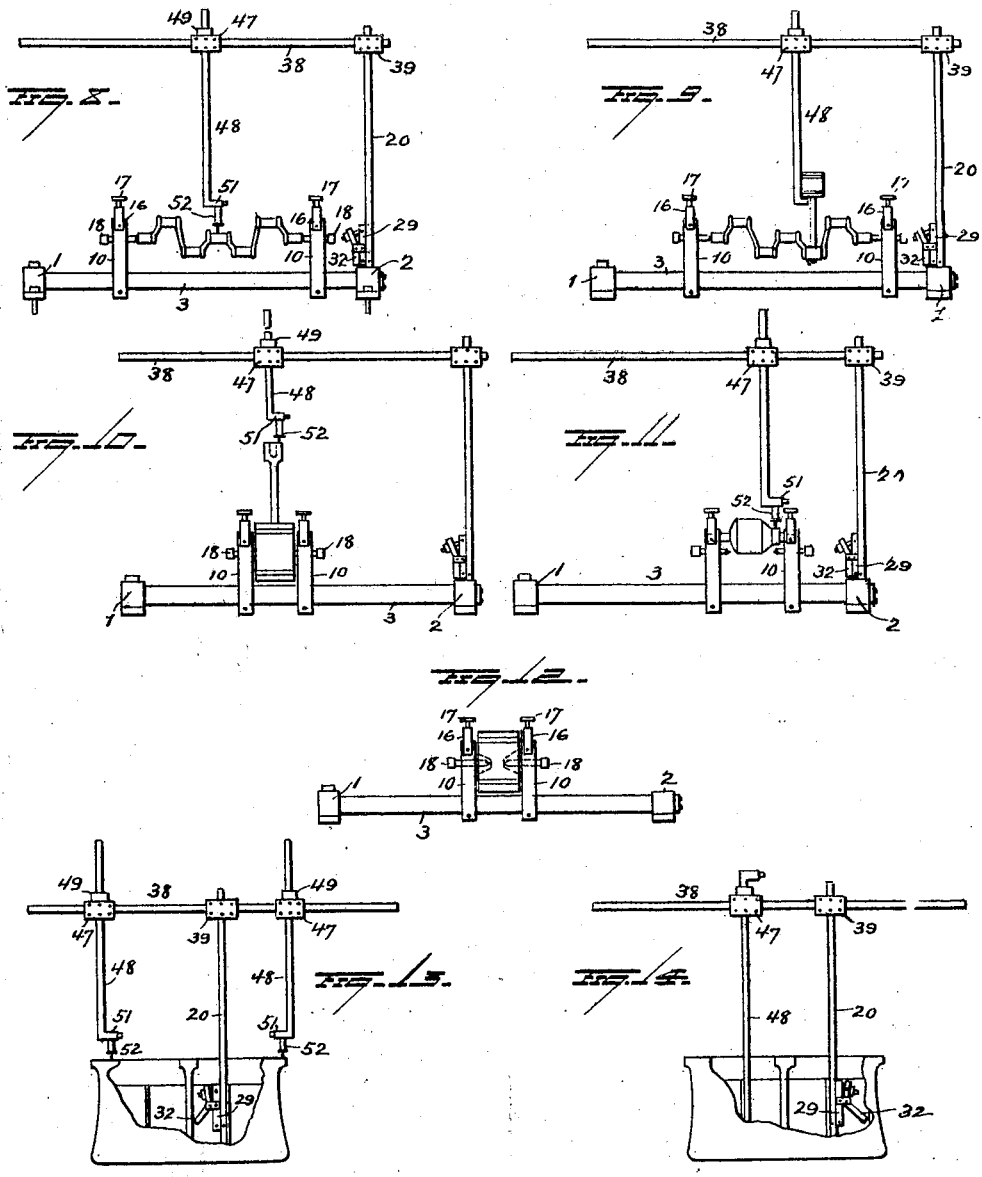

Patented Mar. 9, 1926.

1,576,453

UNITED STATES PATENT OFFICE.

JOHN R. NORDSTROM, OF BELOIT, WISCONSIN, ASSIGNOR OF ONE-HALF TO ELISHA A. BEADLE, OF KEWANEE, ILLINOIS.

TESTING MACHINE.

Application filed March 12, 1924. Serial No. 698,750.

*To all whom it may concern:*

Be it known that I, JOHN R. NORDSTROM, a citizen of the United States, and resident of Beloit, in the county of Rock and State of Wisconsin, have invented certain new and useful Improvements in Testing Machines; and I do hereby declare the following to be a full, clear, and exact description of the invention, such as will enable others skilled in the art to which it appertains to make and use the same.

This invention relates to testing machines and has for its primary object the provision of a simple and easily adjusted apparatus whereby the accuracy of the working parts of a motor may be readily determined. The invention also has for an object the provision of a support whereby a crank shaft or other rotatable member may be arranged in a manner approximating its working mounting and in position to be tested to ascertain whether it is warped or its journals are in alinement. Other objects will appear in the course of the following description and the invention resides in certain novel features which will be particularly pointed out in the appended claims.

In the accompanying drawings, one embodiment of the invention is illustrated, and in the said drawings Figure 1 is a perspective view of the complete device;

Figure 2 is a perspective view of a coupling block which is employed to connect the upper beam with a supporting standard or with the micrometer bar;

Figure 3 is a detail perspective view of one end of the lower bar bracing and supporting rod and the cap which retains the standard therein;

Figure 4 is a detail section on the line 4—4 of Figure 1;

Figure 5 is a similar view on line 5—5 of Figure 1;

Figure 6 is a similar view on line 6—6 of Figure 1;

Figure 7 is a detail section on line 7—7 of Figure 1;

Figure 8 is an elevation showing the apparatus arranged to test the alinement of a crank shaft;

Figure 9 is a similar view showing the manner of testing a pitman or connecting rod;

Figure 10 is a similar view showing the apparatus arranged to test a piston and a connecting rod;

Figure 11 shows how an armature shaft may be tested;

Figure 12 shows how to test the alinement of piston pin holes;

Figure 13 is an elevation showing how the alinement of the main bearings with the cylinder walls may be tested, and Figure 14 shows how to test the parallelism of the walls of the cylinders.

In carrying out the invention, there are provided brackets 1, 2, which may be rigidly secured upon a work bench by cap screws or bolts inserted through their end portions in an obvious manner. Secured at its ends in these brackets is a rigid main supporting rod or brace 3 which is constructed with a longitudinal groove 4 extending its full length, and a diametrical groove or recess 5 across one end meeting and alined with the longitudinal groove. The bracket 1 includes a collar or socket 6 which completely encircles the end of the rod received therein while the bracket 2 is open at the top, as shown at 7. The rod is engaged in the brackets with its longitudinal groove 4 uppermost and it is secured firmly therein by set screws 8, 9, mounted in the brackets and bearing upon the rod, as will be understood. Mounted upon the rod 3, between the brackets, are posts 10 which are identical in construction. Each post consists of a block having an opening 11 at or near its lower end through which the rod is slidably engaged, and in the lower end of the block is a vertical slit 12 extending from the opening. A bolt 13 is engaged through the lower end of the post below the opening and across the slit so that when the bolt is turned home the post will be secured upon the rod at any point where it may be set. A key or lug 14 extends longitudinally of the opening 11 at the top thereof and seats in the groove 4 of the rod so that while the post may be adjusted longitudinally of the rod it cannot rotate thereon. The upper end of the post is recessed or notched to provide a V-shaped seat 15, and a bail or bridge 16 is pivoted to the upper end of the post to extend over the seat transversely to the rod 3. A binding screw 17 is mounted in the cross bar of the bail or bridge at the center thereof and depends therefrom to bear upon the rod, shaft or other element engaged in the seat to hold the same against withdrawal. Engaged through the post, below the upper extremity thereof and in the central vertical plane of the rod 3, is a screw 18 which extends parallel with the rod and has a smooth tapered end, 19. The tapered ends of the two screws 19 are, of course, presented toward each other.

A standard 20 is employed and this standard is angular in cross section and of such dimensions that it may fit easily but snugly at its lower end in the vertical recess 5 in the end of the rod 3, a cap plate 21 being secured to the end of the rod 3 and bridging the recess to retain the standard therein. The cap plate is secured to the end of the rod by screws 22 and secured to the standard by screws 23 so that the standard will be held rigidly in place. Above the lower end of the standard, a slot or socket 24 is formed therein to receive one end of a coupling plate 25 which is secured therein by a bolt or screw 26 inserted through the standard and through a slot 27 in the coupling plate. The outer end of the coupling plate is fitted in a slot 28 in the lower end of a fulcrum bar 29 which normally rests against the inner side of the standard 20 and is connected to the coupling plate by a pivot screw 30, as will be understood. The lower outer corners of the fulcrum bar are rounded off, as indicated at 31, to accommodate rocking movement of the bar. A presser or clamping bar 32 is arranged at the inner side of the fulcrum bar 29 and straps 33 are disposed at the sides of and pivotally attached to said bar and the fulcrum bar 29 near the upper ends of the same to support the former upon the latter. Above the straps, the clamping bar is offset or curved so as to extend away from the fulcrum bar, and a slot 34 is formed in the upper extremity of the clamping bar to permit the passage of the shank of an eyebolt 35 which has its eye engaged upon a pin 36 anchored in the fulcrum bar adjacent the upper end thereof. A nut 37 is mounted on the free end of the bolt 35 and may be turned home against the clamping bar to force the upper end thereof toward the fulcrum bar, thereby swinging the lower end of the clamping bar away from the fulcrum bar.

A beam 38 is carried by the upper end of the standard 20 and extends therefrom above and in the vertical plane of the rod 3. An adjustable coupling is provided to connect the beam with the standard and includes a head 39 receiving the ends of the standard and the beam, and cap plates 40 which hold the standard and the beam to the head. The head is a rectangular block provided in one side with a vertical groove or recess 41 snugly receiving the upper end portion of the standard, and in its opposite side with a horizontal groove or recess 42 snugly receiving the beam, and it is to be noted that the beam and the recess are flat-sided so that rotation or rocking of the beam will be prevented. The cap or cover plates 40 are disposed across the outer sides of the beam and the standard which lie flush with the respective sides of the coupling head, and screws 44 inserted through the edge portions of the respective plates into the head secure the plates in place. Set screws 45 are mounted in the end of the head and bear against the standard to adjustably secure the head upon the standard and set screws 46 are mounted in the top of the head and bear upon the beam to adjustably secure the beam in the head.

A second coupling 47 is mounted on the beam and carries a gage or micrometer bar 48. The coupling 47 is the same in all respects as the first described coupling except that, instead of employing set screws in the head to secure the micrometer bar therein, a collar 49 is engaged around the micrometer bar and rests upon the top of the head, a set screw 50, mounted in the collar, securing it in a desired position upon the micrometer bar so that the lower end of the bar will be adjusted to the proper working point below the beam. The lower extremity of the micrometer bar is formed with a lateral lug or offset 51 in which a depending micrometer pin 52 is secured by a set screw 53.

Various uses of the apparatus are shown. The portion of the apparatus consisting of the standard 20, the beam, and the micrometer bar may be used to test the alinement of the crank shaft bearings upon the cylinder block, and also to ascertain whether the walls of the cylinders are warped out of line with each other. Referring to Figure 13, if the standard 20 be inserted in a cylinder from the crank end, the crank shaft being removed, and the nut 37 turned home the lower end of the bar 32 will be swung pivotally to engage the wall of the cylinder so that the standard will be clamped against the wall at a diametrically opposite point. The beam is then adjusted endwise until its ends project equally over the cylinder block whereupon the screws 46 are turned home to secure it in the set position. The beam will thus be set parallel with alined diameters of the cylinders and at a right angle to the walls of the cylinders. The micrometer bar is then adjusted so that the point of the micrometer pin touches the bottom of one bearing, and by then bringing the micrometer bar into like position upon another bearing and comparing the measurements, it can be quickly seen which bearing is the lowest, and all the bearings can be checked by sliding the bar off one end of the beam and slipping it onto the opposite end thereof. It will be noted that the micrometer bar may be lifted to clear obstructions between crank pins or bearings but will return to the set position when the collar 49 again rests upon the coupling 47. If the micrometer bar be inverted so that the offset 51 is at the top, as shown in Figure 14, the bar may be pushed up alongside the walls of the several cylinders successively to determine whether they are warped or aline properly with the wall of the cylinder in which the standard is clamped.

To ascertain whether a crank shaft is sprung, its ends are engaged with the pivot screws 19 so as to be rotatably supported thereby, as shown in Figure 8, the shaft being thus brought into parallelism with the beam 38. By then bringing the micrometer bar over the center journal or bearing pin of the shaft and revolving the shaft it can be easily determined whether the shaft is bent. In like manner all the journals may be tested. An armature shaft may be tested in a similar manner, as shown in Figure 11, the ends of the shaft being engaged in the seats 15 at the upper ends of the posts 10, and it will be understood that in all such uses of the device, the shaft or other rotatable member is supported by the screws 19 when its ends are center-marked and by the seats 15 when its ends are not so marked.

If the crankshaft be mounted on the screws 18 while a piston is connected with its proper crank pin, as shown in Figure 9, the alinement of the piston may be easily tested by adjusting the micrometer bar along the beam until it is alongside the piston, the pison being held in upright position. If the piston be true, it will be in contact, from end to end with the side of the bar, and by rotating the shaft slowly, the alinement of the piston at all angles may be tested.

By arranging a connecting rod with its piston end supported by and between the posts 10, and causing the micrometer pin to travel across the bearing end of the rod, the accuracy of the bearing may be easily determined. In Figure 10 is shown how the connecting rod bearing may be tested without removing the rod from the piston, the piston being supported by and between the screws 18 which are engaged in the bosses of the piston. If it be desired to test the alinement of the piston bosses, the micrometer bar with the supporting beam and standard may be removed and the piston supported upon the screws 18 between the posts 10, as shown in Figure 12, the posts being brought to the sides of the piston. If the several parts be perfectly true, the piston will be held upright with its sides in contact from end to end with the sides of the posts.

From the foregoing description, taken in connection with the accompanying drawings, it will be seen that I have provided a very simple, compact and inexpensive apparatus whereby the accuracy of parts of a motor may be readily tested. The device is efficient and will be found highly advantageous and useful in automobile repair shops.

Having fully described my invention what I claim as new and desire to secure by Letters-Patent, is:—

1. A testing apparatus comprising a beam, means for supporting the beam over and parallel with a part to be tested, a micrometer bar, a coupling adjustably connecting the micrometer bar with the beam, and a collar adjustably secured upon said bar above and resting upon the coupling to support the bar therein.

2. A testing apparatus comprising a standard, a beam, a micrometer bar, means for coupling the beam to the standard at a right angle thereto and effecting horizontal and vertical adjustment of the beam relative to the standard, and means for coupling the micrometer bar to the beam at a right angle thereto, and effecting horizontal and vertical adjustment of the bar relative to the beam, the coupling means maintaining the beam at a right angle to the standard and the bar at a right angle to the beam in all adjustments.

3. A testing apparatus comprising a standard, a coupling head having a vertical groove in one side receiving the standard, a cover secured upon the head across the standard whereby to retain the standard in the groove, means carried by the head to secure the same in a set position on the standard, the head having a horizontal groove in its side opposite the side having the vertical groove, a beam fitted through said horizontal groove, means for retaining the beam in the groove, means for securing the beam in a set position in the groove, and a micrometer bar adjustably mounted on the beam.

4. In a testing apparatus, the combination of a vertical member, a horizontal member, a coupling head provided in its opposite sides with respectively vertical and horizontal grooves receiving said members, cover plates secured upon the sides of the head and extending across the said members whereby to retain the members in the respective grooves, and means carried by the head and engaging the respective members to secure all the parts in relatively set positions.

5. A testing apparatus comprising a base rod having a vertical groove across one end, a standard having its lower end fitted in said groove, means for securing the standard in the groove, a beam carried by the standard above and parallel with the base rod, a micrometer bar carried by and depending from the beam, and posts on the base rod to support a part to be tested in position to be engaged by the micrometer bar.

6. A testing apparatus comprising a base rod, posts slidably mounted on the rod and restrained against rotation about the rod, the upper ends of the posts having V-shaped recesses therein, bails pivoted upon the upper end portions of the posts and extending over said recesses, and presser screws mounted in said bails over the recesses.

7. In a testing apparatus, the combination of a flat-sided standard, a flat-sided beam, a coupling head provided in opposite sides with a vertical groove and a horizontal groove, said grooves having flat walls and receiving the standard and the beam respectively, plates secured upon the sides of the head and extending across the grooves to retain the standard and the beam therein, and fastening devices mounted in the head and engaging the standard and the beam respectively whereby to secure them in set positions.

In testimony whereof, I have signed this specification.

JOHN R. NORDSTROM.